US011544761B1

(12) United States Patent
Raak et al.

(10) Patent No.: US 11,544,761 B1
(45) Date of Patent: Jan. 3, 2023

(54) FOOD PRODUCT RECOMMENDATION SYSTEM AND RELATED METHODS

(71) Applicant: Inmar Clearing, Inc., Winston-Salem, NC (US)

(72) Inventors: Alise Raak, Winston-Salem, NC (US); Stephanie Hagan, Winston-Salem, NC (US); Lori D. Jones, Winston-Salem, NC (US); Karen Mattingly, High Point, NC (US); Diana Medina, Winston-Salem, NC (US); Amber Shew, Winston-Salem, NC (US); Cheryl Vogler, Lewisville, NC (US)

(73) Assignee: INMAR CLEARING, INC., Winston-Salem, NC (US)

(*) Notice: Subject to any disclaimer, the term of this patent is extended or adjusted under 35 U.S.C. 154(b) by 29 days.

(21) Appl. No.: 16/555,289

(22) Filed: Aug. 29, 2019

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0253* (2013.01); *G06Q 30/0613* (2013.01)

(58) Field of Classification Search
CPC ........... G06Q 30/0631; G06Q 30/0253; G06Q 30/0613
See application file for complete search history.

(56) References Cited

U.S. PATENT DOCUMENTS

| 8,429,026 | B1* | 4/2013 | Kolawa .................. G06Q 30/00 705/26.7 |
| 9,053,483 | B2 | 6/2015 | Geisner et al. |
| 9,179,250 | B2 | 11/2015 | Eustice et al. |
| 2010/0003647 | A1 | 1/2010 | Brown et al. |

(Continued)

FOREIGN PATENT DOCUMENTS

WO 2018214163 A1 11/2018

OTHER PUBLICATIONS

Willems et al., "The path-to-purchase is paved with digital opportunities: An inventory of shopper-oriented retail technologies," (published in Technological Forecasting and Social Change, vol. 124, Nov. 2017, pp. 228-242) (Year: 2017).*

Primary Examiner — Abhishek Vyas
Assistant Examiner — Patrick Kim
(74) Attorney, Agent, or Firm — Allen, Dyer, Doppelt + Gilchrist, P.A.

(57) ABSTRACT

A food product recommendation system may include a camera configured to obtain an image of a food product area having available food products and a remote device associated with a given user. The system may also include a recommendation server configured to cooperate with the remote device to obtain a desired food product characteristic from the given user and determine recommended food products from the available food products based upon the desired food product characteristic. The recommendation server may also be configured to associate a corresponding (Continued)

food product identifier to each recommended food product and communicate the recommended food products to the remote device. The remote device may display the image of the food product area with the recommended food products augmented with the corresponding food product identifiers and obtain user selection for purchase of at least one of the recommended food products based upon the corresponding food product identifier.

23 Claims, 4 Drawing Sheets

(56) References Cited

U.S. PATENT DOCUMENTS

| | | | |
|---|---|---|---|
| 2012/0136751 A1* | 5/2012 | Ochtel | G06Q 30/0633 |
| | | | 715/810 |
| 2013/0218721 A1* | 8/2013 | Borhan | G06Q 30/02 |
| | | | 705/26.41 |
| 2018/0144821 A1 | 5/2018 | Irani-Cohen et al. | |
| 2019/0000382 A1* | 1/2019 | Fitzpatrick | G06F 19/00 |
| 2019/0149725 A1* | 5/2019 | Adato | G06V 20/17 |
| | | | 348/158 |
| 2019/0228450 A1* | 7/2019 | Waldron | H04L 67/306 |
| 2019/0362381 A1* | 11/2019 | Farshori | G06Q 30/0253 |

\* cited by examiner

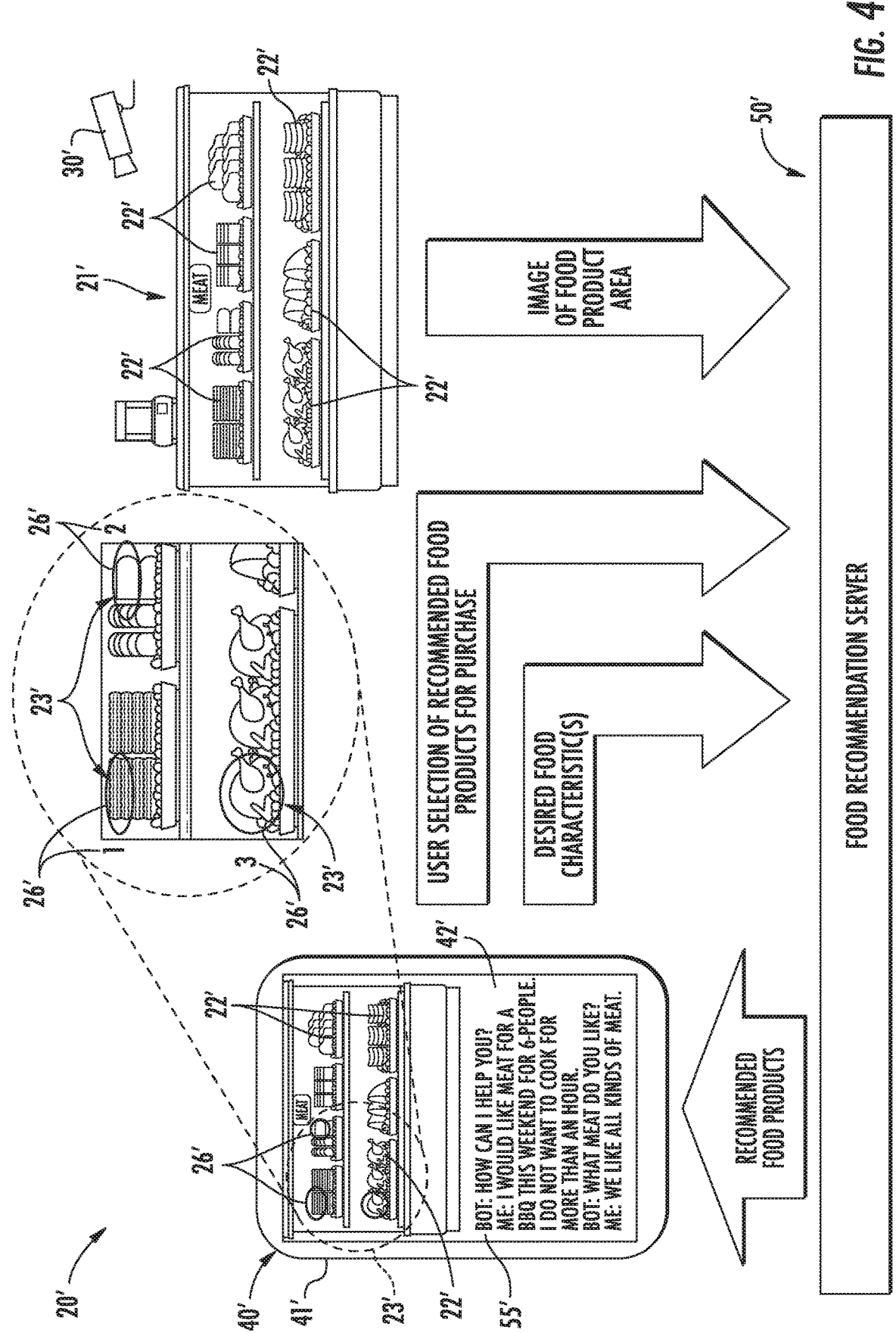

FOOD PRODUCT RECOMMENDATION SYSTEM AND RELATED METHODS

TECHNICAL FIELD

The present invention relates to the field of electronic recommendation systems, and more particularly, to providing food product purchase recommendations and related methods.

BACKGROUND

Fresh or perishable food for sale is typically presented in a display case. The display case may be climate controlled, for example, and permit a shopper to pick a package of the fresh food (e.g., meat, vegetables, prepared foods, etc.) from the display case. Some display cases are closed to the shopper, but permit the shopper to view the contents of the display case. Where the display case is closed to the shopper, a sales clerk typically selects the fresh food for preparation or the fresh food package at the direction of the shopper.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A food product recommendation system may include a camera configured to obtain an image of a food product area having a plurality of available food products and a remote device associated with a given user. The system may include a food product recommendation server configured to cooperate with the remote device to obtain a desired food product characteristic from the given user and determine a plurality of recommended food products from the plurality of available food products based upon the desired food product characteristic. The food product recommendation server may be configured to associate a corresponding food product identifier to each recommended food product, and communicate the plurality of recommended food products to the remote device. The remote device may be configured to display the image of the food product area with the plurality of recommended food products augmented with the corresponding food product identifiers and obtain user selection for purchase of at least one of the plurality of recommended food products based upon the corresponding food product identifier.

The food product recommendation server may be configured to obtain the desired food product characteristic based upon a spoken command, for example. The food product recommendation server may be configured to operate a chatbot via the remote device and obtain the desired food product characteristic based upon the chatbot, for example.

The food product recommendation server may be configured to generate a digital promotion for at least one of the plurality of recommended food products and communicate the digital promotion to the remote device. The remote device may include a display, an input device, and a remote device controller coupled to the display and the input device, and the remote device controller may be configured to display on the display the image of the food product area with the plurality of recommended products augmented with the corresponding food product identifiers, and obtain the user selection for purchase of at least one of the plurality of recommended food products via the input device.

The image of the food product area may include a live image of the food product area, for example. The desired food product characteristic may include a desired food product serving size.

The desired food product characteristic may include a desired food product cost, for example. The desired food product characteristic may include a desired food product type.

The desired food product characteristic may include a desired food cook time. The product identifiers each may include a unique numerical identifier, for example.

A method aspect is directed to a method of recommending a food product. The method may include using a processor and an associated memory to cooperate with a remote device associated with a given user to obtain a desired food product characteristic from the given user and determine a plurality of recommended food products from a plurality of available food products based upon the desired food product characteristic. The plurality of available food products are within an image of a food product area obtained from a camera. The method may also include using the processor to associate a corresponding food product identifier to each recommended food product and communicate the plurality of recommended food products to the remote device so that the remote device displays an image of the food product area with the plurality of recommended food products augmented with the corresponding food product identifiers and so that the remote device obtains user selection for purchase of at least one of the plurality of recommended food products based upon the corresponding food product identifier.

A computer readable medium aspect is directed to a non-transitory computer readable medium for recommending a food product. The non-transitory computer readable medium may include computer executable instructions that when executed by a processor cause the processor to perform operations. The operations may include cooperating with a remote device associated with a given user to obtain a desired food product characteristic from the given user and determining a plurality of recommended food products from a plurality of available food products based upon the desired food product characteristic. The plurality of available food products may be within an image of a food product area obtained from a camera. The operations may also include associating a corresponding food product identifier to each recommended food product and communicating the plurality of recommended food products to the remote device so that the remote device displays an image of the food product area with the plurality of recommended food products augmented with the corresponding food product identifiers and so that the remote device obtains user selection for purchase of at least one of the plurality of recommended food products based upon the corresponding food product identifier.

BRIEF DESCRIPTION OF THE DRAWINGS

FIG. 4 is a schematic diagram of a food product recommendation system in accordance with another embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
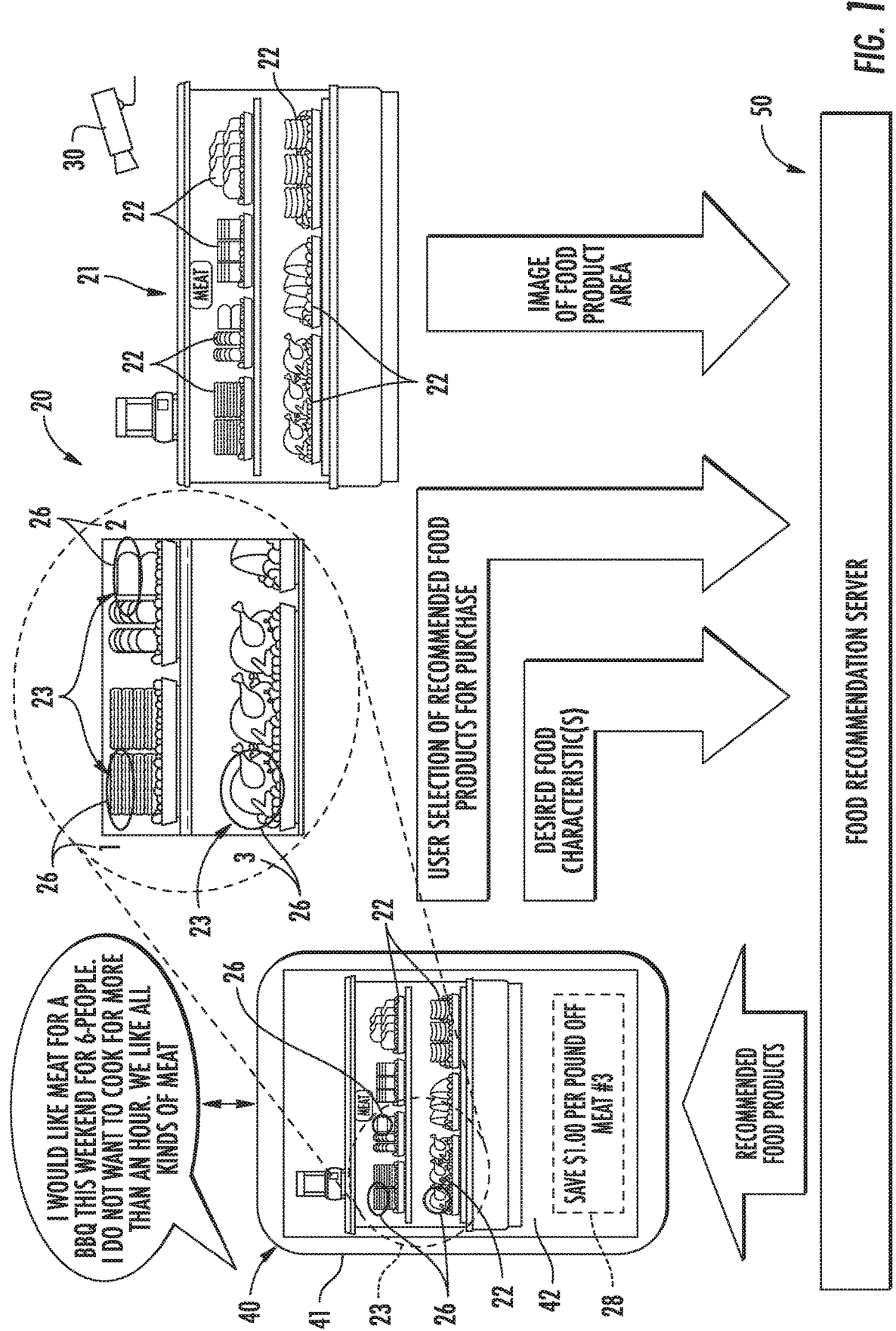
FIG. 1 is a schematic diagram of a food product recommendation system in accordance with an embodiment.
Figure 2:
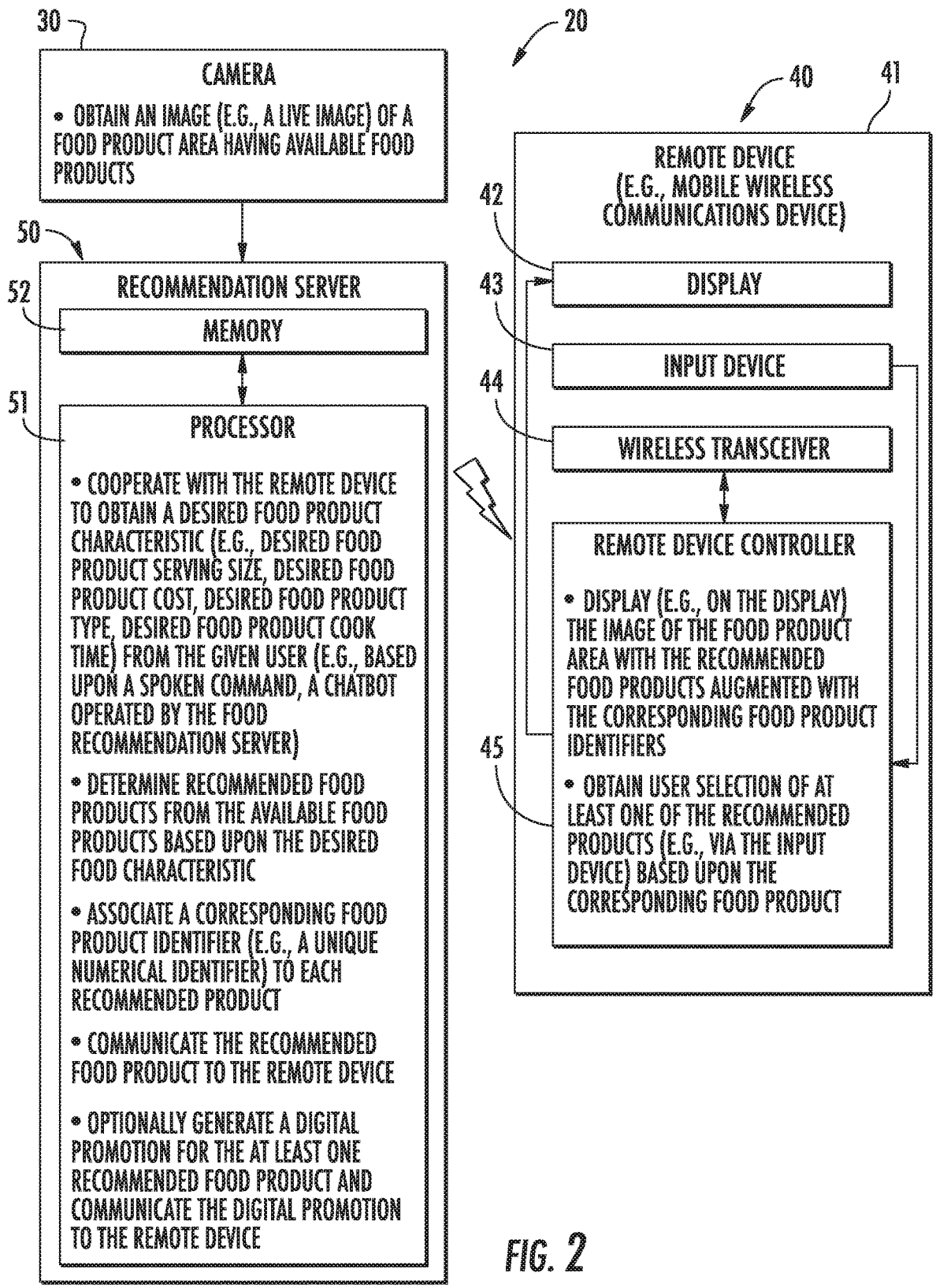
FIG. 2 is a schematic block diagram of the food product recommendation system of FIG. 1.

Referring initially to FIGS. 1 and 2, a food product recommendation system 20 includes a camera 30 that obtains an image of a food product area 21. The food product area 21 includes available food products 22. For example, the food product area 21 may be a meat display case or other refrigerated display case at grocery store. Of course, the food product area 21 may not be refrigerated, for example, a fruit display case or packaged food display case. There may be more than one camera 30.

The camera 30 may obtain more than one image of the food product area 21, which may be streamed as video. The image may be a live image of the food product area 21. The image may be updated at a desired interval, for example, every thirty (30) seconds or other time period. The image may also be updated based upon the given user's operation of the system 20, as will be described in further detail below.

The food product recommendation system 20 also includes a remote device 40 associated with a given user or shopper. The remote device 40 is illustratively in the form of a mobile wireless communications device and includes a housing 41, a display 42 carried by the housing, and an input device 43 also carried by the housing. The display 42 and the input device 43 may be in the form of a touch display, as will be appreciated by those skilled in the art. The remote device 40 also includes a wireless transceiver 44 and a remote device controller 45 coupled to the wireless transceiver. The display 42 and input device 43 are also coupled to the remote device controller 45. While the remote device 40 is illustratively in the form of a mobile wireless communications device, the remote device may include or be in the form of a personal computer, laptop computer, tablet computer, or wearable device.

The food product recommendation system 20 also includes a food product recommendation server 50. The food product recommendation server 50 includes a processor 51 and an associated memory 52. While operations of the food product recommendation server 50 are described herein, it should be appreciated that the operations are performed by way of cooperation between the processor 51 and the associated memory 52.

Figure 3:
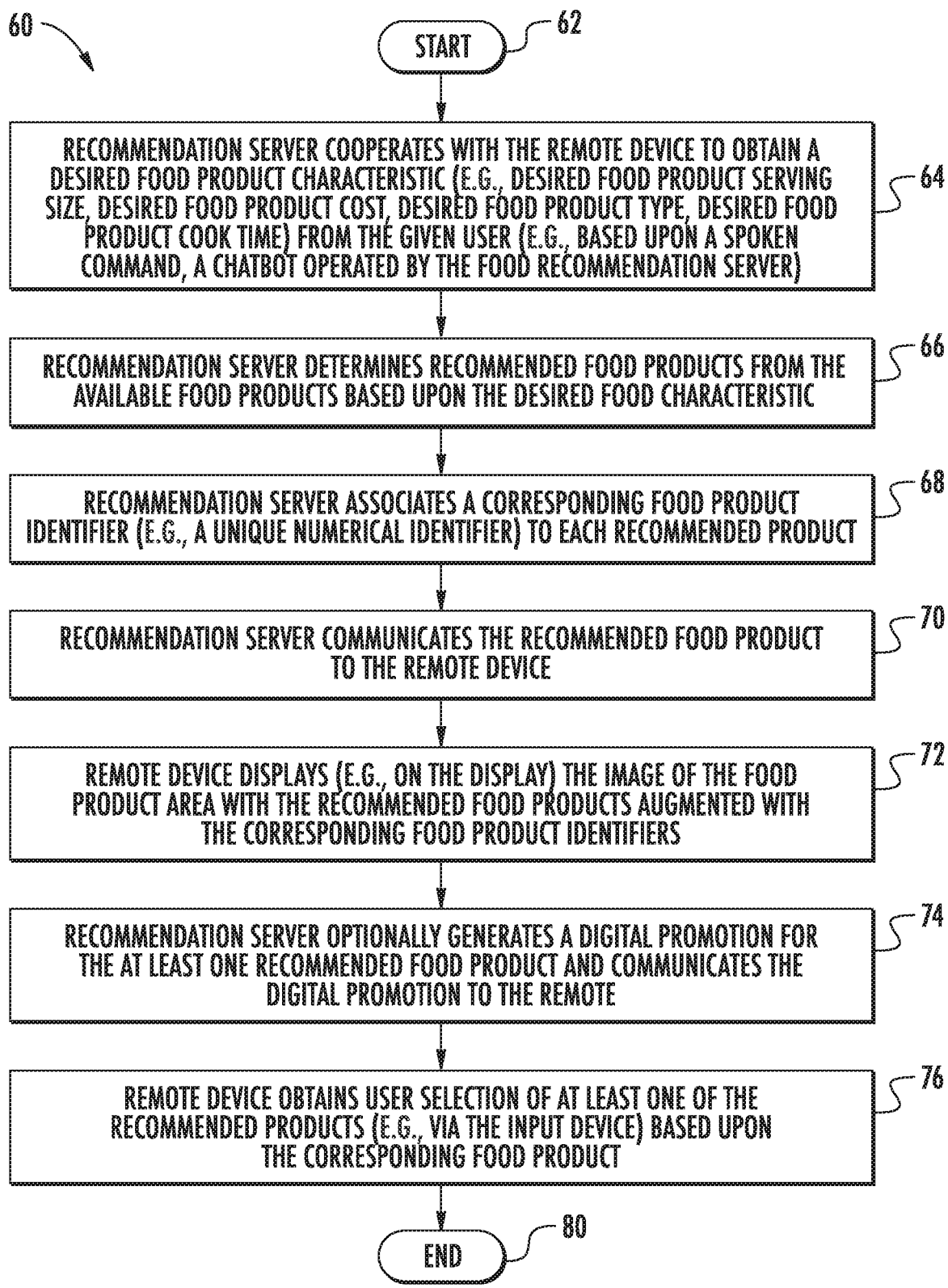
FIG. 3 is a flow diagram illustrating operation of the food product recommendation system in accordance with an embodiment.

Referring now to the flowchart 60 in FIG. 3, beginning at Block 62, operations of the food product recommendation system 20 with respect to the remote device 40 and the food product recommendation server 50 will now be described. At Block 64, the food product recommendation server 50 cooperates with the remote device 40 to obtain a desired food product characteristics from the given user.

The desired food product characteristics may be obtained based upon a spoken command. For example, the food product recommendation server 50 may cooperate with a virtual digital assistant or virtual digital personal shopper (e.g., standalone or via the remote device 40) to audibly obtain, via a conversation, the desired food product characteristics. The desired food product characteristics may include any one or more of a desired food product serving size, a desired food product cost, a desired food product type, and a desired food cook time. The desired food product characteristic may include other and/or additional food product characteristics. In some embodiments, a single food product characteristic may be obtained. The desired food product characteristics may be obtained at any time. The food product recommendation server 50, in some embodiments, may learn desired food product characteristics over time (i.e., infer food product characteristics based upon previously obtained food product characteristics).

An exemplary spoken conversation may include spoken commands and conversation whereby the given user audibly tells the virtual digital personal shopper that they are desirous of meat for six (6) people for a barbeque (BBQ) for the upcoming weekend. The virtual digital personal shopper may audibly prompt the given user with contextual questions, such as, for example, whether there are "big eaters" in the group (for determining size/weight of meat), "how long do you want to cook" (for determining thickness of the meat), and "how much would you like to spend" (for determining which type of meat to provide/suggest).

Referring briefly to FIG. 4, in another embodiment, the food product recommendation server 50' may operate a chatbot 55' via the remote device 40' to obtain the desired food product characteristics. For example, the chatbot 55' may conduct to obtain the desired food product characteristics through a series of questions and answers from the given user via the chatbot.

At Block 66, the food product recommendation server 50 determines recommended food products 23 from the available food products 22 based upon the desired food product characteristics. For example, with respect to the above exemplary conversation for food for a six person BBQ, the food product recommendation server 50 may determine which of the available food products 22 match or most closely match the desired food product characteristics. The food product recommendation server 50 may make the recommendation based upon image recognition techniques of the available food products 22 in the food product area 21 (e.g., of the meat itself, the packaging, and/or the text on the label). In some embodiments, the food product recommendation server 50 may alternatively or additionally have stored in the memory 52 details of the contents (i.e., available food products 22) of the food product area 21.

The food product recommendation server 50, at Block 68, associates a corresponding food product identifier 26 to each recommended food product. The corresponding food product identifier 26 may be unique numerical identifier, for example, and may be indicative of ranking of recommended food products 23. The corresponding food product identifier 26 may be a shape (e.g., a bounding shape), a color, a highlight, a halo, or other effect or indicator that identifies each recommended product. The food product recommendation server 50 communicates the recommended food products 23 to the remote device 40, for example, wirelessly (Block 70).

The remote device 40, at Block 72, based upon the communicated recommended food products 23, displays the image of the food product area 21 on the display 42 with the recommended food products augmented with the corresponding product identifiers 26. Illustratively, the recommended food products 23 are displayed adjacent the corresponding product identifiers 26, in this case unique numerical identifiers, and among the available food products 22. With respect to the BBQ example, above, the package or packages of meat in the meat display case that most closely match the answers to the contextual questions or desired food characteristics may be identified and displayed live by way of the corresponding identifiers 26.

At Block 74, the food product recommendation server 50 may optionally generate a digital promotion 28 for one or more of the recommended food products 23 and communicate the digital promotion to the remote device 40 for display thereat. The digital promotion 28 may be generated based upon any of the price of the recommended food products 23, the remaining shelf life the recommended food products, a ranking (e.g., a highest or lowest) of the recommended food products, and/or demand for the recommended products by other users or shoppers. The digital promotion 28 may be generated based upon other and/or additional characteristics.

The remote device 40, by way of cooperation between the input device 43 and remote device controller 45, obtains user selection, for example, via the input device, for purchase of one or more of the recommended food products 23 based upon the corresponding food product identifier 26 (Block 76). More particularly, the given user may provide input to the remote device 40 (e.g., via the touch display), selecting the desired one or ones of the recommended food products 23. Based upon the user selection, the selected food products may be added to a virtual shopping cart for purchase via an electronic commerce platform and/or for pick-up or delivery service. The remote device 40 may communicate the selected food products to the food product recommendation server 50 or another server or device, for example, to effectuate the purchase of the desired selected food products. Operations end at Block 80.

A method aspect is directed to a method of recommending a food product. The method includes using a processor 51 and an associated memory 52 to cooperate with a remote device 40 associated with a given user to obtain a desired food product characteristic from the given user and determine a plurality of recommended food products 23 from a plurality of available food products 22 based upon the desired food product characteristic. The plurality of available food products 22 are within an image of a food product area 21 obtained from a camera 30. The method also includes using the processor 51 to associate a corresponding food product identifier 26 to each recommended food product 23 and communicate the plurality of recommended food products to the remote device 40 so that the remote device displays an image of the food product area 21 with the plurality of recommended food products augmented with the corresponding food product identifiers and so that the remote device obtains user selection for purchase of at least one of the plurality of recommended food products based upon the corresponding food product identifier.

A computer readable medium aspect is directed to a non-transitory computer readable medium for recommending a food product. The non-transitory computer readable medium includes computer executable instructions that when executed by a processor 51 cause the processor to perform operations. The operations include cooperating with a remote device 40 associated with a given user to obtain a desired food product characteristic from the given user and determining a plurality of recommended food products 23 from a plurality of available food products 22 based upon the desired food product characteristic. The plurality of available food products 22 may be within an image of a food product area 21 obtained from a camera 30. The operations also include associating a corresponding food product identifier 26 to each recommended food product 23 and communicating the plurality of recommended food products to the remote device 40 so that the remote device displays an image of the food product area 21 with the plurality of recommended food products augmented with the corresponding food product identifiers and so that the remote device obtains user selection for purchase of at least one of the plurality of recommended food products based upon the corresponding food product identifier.

While several embodiments have been described herein, it should be appreciated by those skilled in the art that any element or elements from one or more embodiments may be used with any other element or elements from any other embodiment or embodiments.) Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A food product recommendation system comprising:
   a camera fixed adjacent a food product area and configured to obtain a live image of the food product area having a plurality of available food products;
   a remote device associated with a given user and remote from the camera and comprising a display; and
   a food product recommendation server configured to
      cooperate with the remote device to obtain a plurality of desired food product characteristics for a desired given meal from the given user, the plurality of desired food product characteristics comprising a desired food product serving size corresponding to a desired number of eaters for the desired given meal and a desired food product type for the desired given meal,
      determine a plurality of recommended food products from the plurality of available food products based upon an amount of the plurality of desired food product characteristics matching to characteristics of the plurality of available food products by applying image recognition techniques to the live image of the food product area to identify the characteristics of the plurality of available food products in the food product area by recognizing at least one of a food product itself of the plurality of available food products, packaging of the plurality of available food products, and text on the packaging of the plurality of available food products, associate a corresponding food product identifier to each recommended food product, generate a digital coupon for one of the plurality of recommended food products based upon an actual characteristic of the plurality of recommended food products, and communicate the plurality of recommended food products and the digital coupon to the remote device;

the remote device configured to display, on the display, the live image of the food product area with the plurality of recommended food products augmented with the corresponding food product identifiers adjacent the plurality of recommended food products, display, on the display, the digital coupon adjacent the live image of the food product area, and obtain user selection for purchase of at least one of the plurality of recommended food products based upon the corresponding food product identifier.

2. The system of claim 1 wherein the food product recommendation server is configured to obtain the desired food product characteristics based upon a spoken command.

3. The system of claim 1 wherein the food product recommendation server is configured to operate a chatbot via the remote device and obtain the plurality of desired food product characteristics based upon the chatbot.

4. The system of claim 1 wherein the remote device comprises, an input device and a remote device controller coupled to the input device; and wherein the remote device controller is configured to obtain the user selection for purchase of at least one of the plurality of recommended food products via the input device.

5. The system of claim 1 wherein the plurality of desired food product characteristics comprises a desired food product cost.

6. The system of claim 1 wherein the plurality of desired food product characteristics comprises a desired food cook time.

7. The system of claim 1 wherein the product identifiers each comprises a unique numerical identifier.

8. A food product recommendation server comprising:

a processor and an associated memory configured to cooperate with a remote device associated with a given user to obtain a plurality of desired food product characteristics from the given user, the plurality of desired food product characteristics comprising a desired food product serving size corresponding to a desired number of eaters for a desired given meal and a desired food product type for the desired given meal, determine a plurality of recommended food products from a plurality of available food products based upon an amount of the plurality of desired food product characteristics matching to characteristics of the plurality of available food products by applying image recognition techniques to a live image of a food product area to identify the characteristics of the plurality of available food products in the food product area by recognizing at least one of a food product itself of the plurality of available food products, packaging of the plurality of available food products, and text on the packaging of the plurality of available food products, the plurality of available food products being within the live image of the food product area obtained from a camera fixed adjacent the food product area and remote from the remote device, generate a digital coupon for one of the plurality of recommended food products based upon an actual characteristic of the plurality of recommended food products, associate a corresponding food product identifier to each recommended food product, and communicate the plurality of recommended food products and the digital coupon to the remote device so that the remote device displays, on a display of the remote device, the live image of the food product area with the plurality of recommended food products augmented with the corresponding food product identifiers adjacent the plurality of recommended food products, so that the remote device displays, on the display of the remote device, the digital coupon adjacent the live image of the food product area, and so that the remote device obtains user selection for purchase of at least one of the plurality of recommended food products based upon the corresponding food product identifier.

9. The food product recommendation server of claim 8 wherein the processor is configured to obtain the plurality of desired food product characteristics based upon a spoken command.

10. The food product recommendation server of claim 8 wherein the processor is configured to operate a chatbot via the remote device and obtain the plurality of desired food product characteristics based upon the chatbot.

11. The food product recommendation server of claim 8 wherein the plurality of desired food product characteristics comprises at least one of a desired food product cost, and a desired food cook time.

12. A method of recommending a food product comprising:

using a processor and an associated memory of the food product recommendation server to cooperate with a remote device associated with a given user to obtain a plurality of desired food product characteristics from the given user, the plurality of desired food product characteristics comprising a desired food product serving size corresponding to a desired number of eaters for a desired given meal and a desired food product type for the desired given meal, determine a plurality of recommended food products from a plurality of available food products based upon an amount of the plurality of desired food product characteristics matching to characteristics of the plurality of available food products by applying image recognition techniques to a live image of the food product area to identify the characteristics of the plurality of available food products in the food product area by recognizing at least one of a food product itself of the plurality of available food products, packaging of the plurality of available food products, and text on the packaging of the plurality of available food products, the plurality of available food products being within the live image of the food product area obtained from a camera fixed adjacent the food product area and remote from the remote device, associate a corresponding food product identifier to each recommended food product, generate a digital coupon for one of the plurality of recommended food products based upon an actual characteristic of the plurality of recommended food products, and communicate the plurality of recommended food products and the digital coupon to the remote device so that the remote device displays, on a display of the remote device, the live image of the food product area with the plurality of recommended food products augmented with the corresponding food product identifiers adjacent the plurality of recommended food products, so that the digital coupon is displayed on the display of the remote device adjacent the live image of the food product area, and so that the remote device obtains user selection for purchase of at least one of the plurality of recommended food products based upon the corresponding food product identifier.

13. The method of claim 12 wherein using the processor comprises using the processor to obtain the plurality of desired food product characteristics based upon a spoken command.

14. The method of claim 12 wherein using the processor comprises using the processor to operate a chatbot via the remote device and obtain the plurality of desired food product characteristics based upon the chatbot.

15. The method of claim 12 wherein the plurality of desired food product characteristics comprises at least one of a desired food cook time and a desired product cost.

16. A non-transitory computer readable medium for recommending a food product, the non-transitory computer readable medium comprising computer executable instructions that when executed by a processor cause the processor to perform operations comprising:

cooperating with a remote device associated with a given user to obtain a plurality of desired food product characteristics for a desired given meal from the given user, the plurality of desired food product characteristics comprising a desired food product serving size corresponding to a desired number of eaters for the desired given meal and a desired food product type for the desired given meal;

determining a plurality of recommended food products from a plurality of available food products based upon an amount of the plurality of desired food product characteristics matching to characteristics of the plurality of available food products by applying image recognition techniques to a live image of a food product area to identify the characteristics of the plurality of available food products in the food product area by recognizing at least one of a food product itself of the plurality of available food products, packaging of the plurality of available food products, and text on the packaging of the plurality of available food products, the plurality of available food products being within the live image of the food product area obtained from a camera fixed adjacent the food product area and remote from the remote device;

associating a corresponding food product identifier to each recommended food product;

generating a digital coupon for one of the plurality of recommended food products based upon an actual characteristic of the plurality of recommended food products; and communicating the plurality of recommended food products and the digital coupon to the remote device so that the remote device displays, on a display of the remote device, the live image of the food product area with the plurality of recommended food products augmented with the corresponding food product identifiers adjacent the plurality of recommended food products, so that the digital coupon is displayed on the display of the remote device adjacent the live image of the food product area, and so that the remote device obtains user selection for purchase of at least one of the plurality of recommended food products based upon the corresponding food product identifier.

17. The non-transitory computer readable medium of claim 16 wherein the operations comprise obtaining the plurality of desired food product characteristics based upon a spoken command.

18. The non-transitory computer readable medium of claim 16 wherein the operations comprise operating a chatbot via the remote device and obtaining the at least one desired food product characteristics based upon the chatbot.

19. The non-transitory computer readable medium of claim 16 wherein the desired food product characteristics comprises at least one of a desired food product cost, and a desired food cook time.

20. The food product recommendation system of claim 1 wherein the actual characteristic of the plurality of recommended food products comprises at least one of price of the plurality of the recommended food products, remaining shelf life of the plurality of recommended food products, a ranking of the plurality of recommended food products, and a demand for the plurality of recommended products by other users.

21. The food product recommendation server of claim 8 wherein the actual characteristic of the plurality of recommended food products comprises at least one of price of the plurality of the recommended food products, remaining shelf life of the plurality of recommended food products, a ranking of the plurality of recommended food products, and a demand for the plurality of recommended products by other users.

22. The method of claim 12 wherein the actual characteristic of the plurality of recommended food products comprises at least one of price of the plurality of the recommended food products, remaining shelf life of the plurality of recommended food products, a ranking of the plurality of recommended food products, and a demand for the plurality of recommended products by other users.

23. The non-transitory computer readable medium of claim 16 wherein the actual characteristic of the plurality of recommended food products comprises at least one of price of the plurality of the recommended food products, remaining shelf life of the plurality of recommended food products, a ranking of the plurality of recommended food products, and a demand for the plurality of recommended products by other users.

* * * * *